United States Patent [19]

Sakurai

[11] Patent Number: 5,531,977
[45] Date of Patent: Jul. 2, 1996

[54] PROCESS FOR PRODUCING ACICULAR γ-FEOOH PARTICLES

[75] Inventor: Kaoru Sakurai, Yokkaichi, Japan

[73] Assignee: Ishihara Sangyo Kaisha Ltd., Osaka, Japan

[21] Appl. No.: 400,004

[22] Filed: Mar. 6, 1995

Related U.S. Application Data

[63] Continuation of Ser. No. 92,422, Jul. 16, 1993, abandoned.

[30] Foreign Application Priority Data

Jul. 17, 1992 [JP] Japan .................................. 4-213666

[51] Int. Cl.$^6$ .................................. C01G 49/06
[52] U.S. Cl. ........................ 423/634; 423/632; 252/62.56
[58] Field of Search ...................... 423/265, 266, 423/634, 633; 252/62.56

[56] References Cited

U.S. PATENT DOCUMENTS

| | | | |
|---|---|---|---|
| 3,382,174 | 5/1968 | Hund | 423/634 |
| 4,061,725 | 12/1977 | Ohlinger et al. | 423/634 |
| 4,176,172 | 11/1979 | Bennetch et al. | 423/634 |
| 4,295,879 | 10/1981 | Steck et al. | 75/0.5 |
| 4,713,261 | 12/1987 | Masaki et al. | 427/129 |
| 4,729,785 | 3/1988 | Schwab et al. | 75/0.5 |

FOREIGN PATENT DOCUMENTS

| | | |
|---|---|---|
| 3516884 | 11/1986 | Germany . |
| 298494 | 2/1992 | Germany ............... 423/634 |
| 43-2214 | 4/1968 | Japan . |
| 56-41835 | 4/1981 | Japan . |
| 61-256705 | 11/1986 | Japan . |
| 63-69714 | 3/1988 | Japan . |
| 1060767 | 3/1967 | United Kingdom . |

*Primary Examiner*—Ngoc-Yen Nguyen
*Attorney, Agent, or Firm*—Cushman Darby & Cushman

[57] ABSTRACT

Acicular γ-FeOOH particles useful as precursors for magnetic particles suitable for magnetic recording are produced advantageously in industry. In a reaction of the growth of γ-FeOOH nuclei by oxidizing a suspension containing γ-FeOOH nuclei in a ferrous salt solution while neutralizing with alkali, a phosphorus compound is added to the reaction mixture at the time before the end of said reaction and when the ratio of $Fe^{++}$/total Fe in the reaction mixture is 0.15 or less.

10 Claims, 1 Drawing Sheet

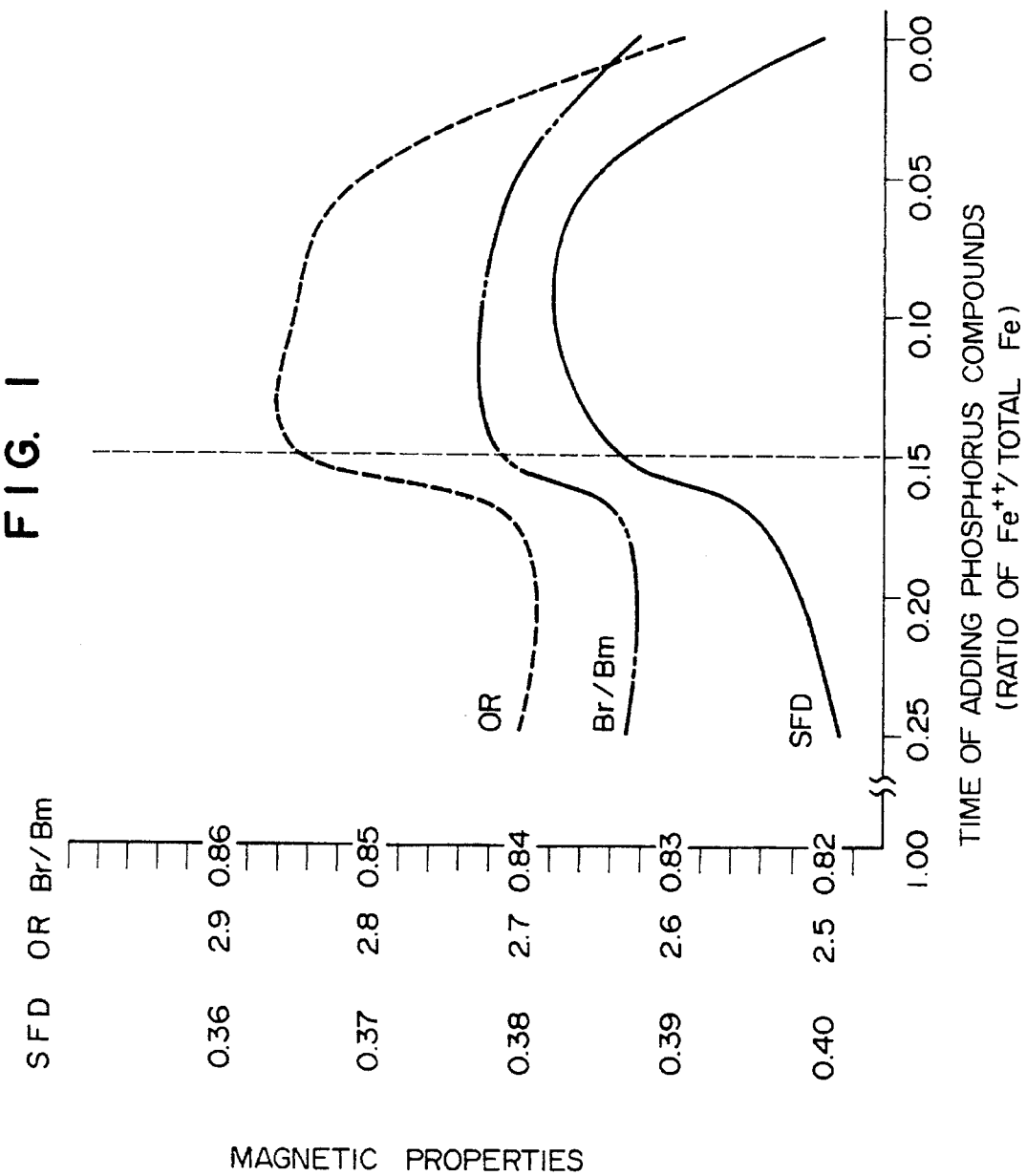

PROCESS FOR PRODUCING ACICULAR γ-FEOOH PARTICLES

This is a continuation of application Ser. No. 08/092,422, filed on Jul. 16, 1993, which was abandoned.

BACKGROUND OF THE INVENTION

1. Field of the Invention

The present invention relates to a process for producing acicular γ-FeOOH particles useful for starting material, from which magnetic particles suitable for magnetic recording can be produced.

2. Description of the Related Art

There have been most widely used heretofore iron oxide based magnetic particles and metallic iron based ones to produce magnetic recording mediums such as audio tapes, video tapes, magnetic disks, and magnetic cards. Generally, known processes for producing these magnetic particles include a process where a solution of any one of various iron salts such as iron sulfate and iron chloride is neutralized with alkali and then oxidized to produce hydrous iron oxides such as acicular α-FeOOH (goethite), and γ-FeOOH (lepidocrocite) as precursors which are sequentially subjected to firing (dehydration, tempering), reduction, oxidation and the like to produce acicular γ-$Fe_2O_3$ (maghemite), $FeO_x$ ($1.5 < x \leq 1.33$: berthollide), $Fe_3O_4$ (magnetite); and a process where the iron oxides as described above are further subjected to a modification treatment with cobalt to produce Co—γ-$Fe_2O_3$, Co—$FeO_x$, or Co—$Fe_3O_4$. Furthermore, metallic magnetic particles can be produced by performing further reduction in the process as described above without terminating the reduction at the stage of $Fe_3O_4$ (magnetite).

Recently there has been a need for magnetic particles having more superior magnetic characteristics as magnetic recording mediums have been highly upgraded. In order to obtain more superior magnetic characteristics, improvement of magnetic characteristics such as coercive force, saturation magnetization and orientabilty as well as micronization of magnetic particles must be achieved. For the production of such magnetic particles having improved characteristics, it is important to improve the precursors for various properties such as particle size, distribution of particle size and crystallinity as well as to conduct the heat-treatment steps such as firing, reduction and oxidation as described above without causing any sintering of the precursor particles and any deformation thereof to produce magnetic particles retaining high acicularity.

The precursors include typically α-FeOOH (goethite) and γ-FeOOH (lepidocrocite), and the γ-FeOOH is characterized by scarcely generating twinned crystals in the precipitating course in contrast to α-FeOOH. Therefore, the ultimate magnetic particles produced from the precursor γ-FeOOH are said to be linear acicular particles having no branched structure which have a higher dispersibility in synthetic resin mediums in the course of processing the particles into magnetic tapes, an excellent orientability and a higher coercive force to facilitate the production of much better products. On the other hand, however, γ-FeOOH is more thermally unstable than α-FeOOH and hence it is difficult for the particles of γ-FeOOH to retain their acicularity during the heat-treatments such as firing, reduction and oxidation, which has obstructed taking the advantages of γ-FeOOH until now. Thus, α-FeOOH has been rather employed as precursor in numerous instances.

Some attempts have been made heretofore to employ the treatment with a phosphorus compound and the like in the course of the production of γ-FeOOH or magnetic particles from the precursor, γ-FeOOH as proposed in, for example, 1) Japanese Patent Publication, No. 43-2214; 2) Japanese Patent KOKAI (Laid-open) No. 61-256705; 3) Japanese Patent KOKAI (Laid-open) No. 56-41835; and 4) Japanese Patent KOKAI (Laid-open) No. 63-69714. The publication 1) discloses a process for producing γ-FeOOH at a high space velocity and a high yield by adding a water soluble phosphorus compound or an arsenic compound before or after the nucleation reaction of γ-FeOOH allowing the growth reaction to be effected at a higher temperature than that used in the previous methods, thereby achieving a higher rate of growth of γ-FeOOH nuclei to produce a precursor suitable primarily for pigment iron oxide particles. The patent KOKAI 2) discloses a process for producing acicular metallic magnetic particles having a high coercive force and a low noise by conducting the nucleation reaction of γ-FeOOH in the presence of a phosphorus compound, effecting the growth of the resultant nuclei to produce γ-FeOOH particles, then performing a specific surface treatment, dehydrating, and then reducing the resulting particles under heat. The patent KOKAI 3) discloses a process for producing acicular metallic iron particles by coating a phosphorus compound and an organic carboxyl acid on the surfaces of γ-FeOOH particles or a mixture of γ-FeOOH and α-FeOOH particles, and heat-reducing the coated particles under specific conditions. The patent KOKAI 4) discloses a process for producing magnetic iron oxide particles by treating hydrous iron oxide particles such as γ-FeOOH particles with a phosphorus compound in vapor phase during firing, and then conducting the reduction and oxidation of the treated particles.

In these processes, however, as in the patent 1) and 2), the addition of phosphorus compounds in the course of the nucleation reaction or the initial crystal growth reaction of γ-FeOOH particles has a great influence on the configuration of the γ-FeOOH particles produced and a slight variation in the amount of the phosphorus compounds to be added may result in a great variation in size and particle configuration of the γ-FeOOH particles produced to adversely affect the acicularity of the particles. Particularly, the process of the patent 1) is characterized by the production of cubic particles suitable for the precursor materials, from which iron oxide particles for pigments can be produced, and it does achieve little effect to preserve the acicularity of the particles as antisintering agent in the course of production of magnetic iron oxide particles or magnetic metallic iron particles through the heat-treatment of the produced γ-FeOOH as described above.

The process of coating the phosphorus compounds on the surfaces of the produced γ-FeOOH particles as proposed in the patent 3) has a very low coating efficiency of the phosphorus compounds onto the surfaces of the γ-FeOOH particles, and it is difficult to coat the phosphorus compounds in a controlled amount because the amount is influenced by the size of the γ-FeOOH particles, which makes it difficult to consistently control the magnetic characteristics of the magnetic metallic iron particles, which can be produced by the heat-treatment, with an actually coated amount being too low or too high, though the phosphorus compounds are appreciated to have an effect as antisintering agent.

The process of treating the surfaces of the produced γ-FeOOH particles with the phosphorus compounds and the like in vapor phase as propsed in the patent 4) can not be said advantageous in industry in view of the fact that the phosphorus compounds to be used are very toxic such as $PH_3$, $P_2H_4$ and the like as well as of facilities and operations to be employed.

SUMMARY OF THE INVENTION

A primary object of the present invention is to provide a process for producing acicular γ-FeOOH particles having an excellent thermal stability, and useful as precursor for providing excellent magnetic characteristics to magnetic iron oxide particles, from which magnetic particles useful for magnetic recording can be produced.

Another object of the present invention is to provide acicular γ-FeOOH particles produced by the aforementioned process.

The process for producing acicular γ-FeOOH particles according to the present invention comprises effecting the growth of γ-FeOOH nuclei by oxidizing a suspension containing γ-FeOOH nuclei in a ferrous salt solution while neutralizing with alkali, where a phosphorus compound is added to the reaction mixture when the ratio of $Fe^{++}$/total Fe is 0.15 or less in the course of the growth reaction.

BRIEF DESCRIPTION OF THE DRAWINGS

FIG. 1 is a graph showing the squareness (Br/Bm), the ratio of orientation (OR) and the switching field distribution (SFD) as a function of the time of adding the phosphorus compound obtained by plotting the data of magnetic characteristics of the tapes with the samples produced in Examples 2 to 4 and Comparative Examples 3 to 6.

DETAILED DESCRIPTION OF PREFERRED EMBODIMENTS

The present inventors have studied various treatment processes for improving the preservability in configuration of γ-FeOOH particles during the heat-treatment thereof and found that the phosphorus compounds be added in the course of the production of γ-FeOOH have greatly varing effects on the characteristics of the resultant γ-FeOOH particles and the magnetic iron oxide particles derived from the γ-FeOOH particles depending upon the time of the addition of the phosphorus compounds and that the available utilization rate of the added phosphorus compounds varies also depending upon the time of the addition thereof. On the basis of such findings, a further research has been made, and as a result, it has been discovered that in the reaction where a suspension containing γ-FeOOH nuclei in a ferrous salt solution is oxidized while neutralizing with alkali to effect the growth of the nuclei, the phosphorus compounds should be added to the reaction mixture when the rate of $Fe^{++}$/total Fe in the reaction mixture is not higher than 0.15, preferably 0.025 to 0.15, more preferably 0.05 to 0.15 before the end of the reaction, thereby allowing the production of acicular γ-FeOOH particles exhibiting such an excellent thermal durability during heat-treatment as could not be achieved in the prior art. The use of the resultant acicular γ-FeOOH particles as precursors allows attainment of magnetic particles having extremely superior coercive force and squareness, with which there can be produced magnetic tapes being excellent in coercive force and squareness, especially in inversion magnetic field distribution. In addition, this process can achieve a higher rate of utilization with the phosphorus compounds as well as the desired effects even with a smaller amount of the compounds to be added. The present invention is completed on the basis of these discoveries.

The present invention will be described in detail under.

The ferrous salt solutions to be used in the present invention include solutions of ferrous salts such as ferrous sulfate, ferrous nitrate and ferrous chloride in mineral acids. Ferrous chloride is preferred in industry.

The alkalis to be used for neutralization include sodium hydroxide, potassium hydroxide, sodium oxide, sodium carbonate, and ammonia. Preferred are sodium hydroxide, potassium hydroxide, sodium carbonate in industry. These may be used alone or in combination thereof.

Oxidants to be used for oxidation include air, oxygen and other oxidizing agents with air being preferred. The phosphorus compounds to be added are not critical in so far as they are water soluble phosphorus compounds, and for example, phosphoric acids such as orthophosphoric acid, metaphosphoric acid, pyrophosphoric acid, phosphorous acid, hypophosphorous acid, hexametaphosphoric acid, and salts such as alkali metal or ammonium salts of the aforementioned acids, sodium dihydrogen phosphate, sodium hydrogen phosphite, and sodium ammonium hydrogen phosphate can be conveniently used. Particularly, in industry, orthophosphoric acid, hexametaphosphoric acid, sodium hydrogen phosphite, and sodium ammonium hydrogen phosphate are preferred.

In the present invention, first a ferrous salt solution is neutralized with alkali and oxidized to produce γ-FeOOH nuclei forming a suspension thereof in the ferrous salt solution. The suspension may be produced by mixing separately prepared γ-FeOOH nuclei with a separately prepared ferrous salt solution, or partly neutralizing a ferrous salt solution with alkali while oxidizing to convert a part of the Fe content in the solution into γ-FeOOH nuclei, or mixing a suspension, which has been obtained by partly neutralizing a ferrous salt solution with alkali under oxidation, with a ferrous salt solution. In any case, the ratio of $Fe^{+++}$/total Fe in the suspension (containing both the liquid phase and the solid phase) should be preferably not higher than 0.8 in order to produce γ-FeOOH particles having a good acicularity and an excellent size distribution. In the following, the use of a suspension which is prepared by partly neutralizing a ferrous salt solution suitable in the industrial practice with alkali under oxidation to convert a part of the Fe content in the solution into γ-FeOOH nuclei will be further described.

When a ferrous salt solution is partly neutralized with alkali and oxidized to convert a part of the Fe content into γ-FeOOH nuclei, the concentration of Fe in the ferrous salt solution is generally in the range of 10 grams/liter to 100 grams/liter, and the amount of alkali to be added is in the range of 10% to 85% based on the equivalent for neutralization of the Fe ions in the parent solution. These conditions may be conveniently selected depending upon the desired size of the resulting γ-FeOOH particles.

The temperature of the nucleation reaction should be generally 50° C. or lower, preferably 10° to 40° C. If the temperature is lower than the defined range, the reaction time is too long resulting in a broad size distribution, while the temperature is too high, the produced nuclei are unsuitable to obtain fine particles, or goethite and granular magnetite are apt to be formed.

In this reaction, the oxidation should be rapidly conducted in the range of, generally 30 to 300 minutes, preferably 60 to 150 minutes by controlling the amount of oxygen-containing gas to be blown and the revolution speed of a stirrer, though the reaction time can not generally be defined because it depends upon the temperature. The suitable amount of oxygen-containing gas to be introduced is generally in the range of 0.1 to 10 liters/minute based on one liter of the suspension.

After the aforementioned nucleation reaction is completed, there is produced a suspension of γ-FeOOH nuclei in the ferrous salt solution which is then oxidized while adding alkali and, if necessary, a ferrous salt solution, to effect the growth of the nuclei to produce the desired γ-FeOOH particles. In the course, the growth of the nuclei should be desirably controlled to attain not greater than 3 times, preferably not greater than 2 times the weight of the starting nuclei, thereby allowing the production of γ-FeOOH particles having a good acicularity and an excellent size distribution.

The addition of the phosphorus compounds should be conducted at the time before the end of the reaction for the growth of the nuclei where the suspension containing the γ-FeOOH nuclei in the ferrous salt solution is oxidized while neutralizing with alkali and when the ratio of $Fe^{++}$/total Fe in the reaction mixture (containing both the liquid phase and the solid phase) is 0.15 or less, preferably 0.12 or less. The addition of the phosphorus compounds earlier than the defined time, or at or after the end of the nuclei growth reaction does not result in the desired effects.

The amount of the phosphorus compounds to be added should be in the range of 0.05 to 5.0% by weight, preferably 0.1 to 2.0% by weight expressed as P based on the γ-FeOOH to be produced. Addition of the phosphorus compounds in a smaller amount than the defined limits makes it difficult to achieve the desired effects, while too large amount of the compounds added may cause undesirably an increase in the amount of non-magnetic materials in the magnetic particles derived from the γ-FeOOH and a reduction in saturation magnetization (σs). The addition of the phosphorus compounds may be accomplished by any one of methods such as adding at one time, or in protions, or gradually over an extended length of time so far as it is accomplished within the defined period of time.

The temperature of the nuclei growth reaction should be normally 50° C. or lower, preferably 30° to 45° C. The temperature higher than the defined range may undesirably cause the formation of granular magnetite in the products and adversely affect the acicularity (aspect ratio). The pH should be maintained generally at 6.0 or less, preferably in the range of 3.5 to 5.0.

The nucleation reaction and the nuclei growth reaction of the γ-FeOOH particles according to the present invention can be performed in a batch or continuous process.

The present invention will be illustrated with reference to the following Examples and Comparative Examples. It is a matter of course that the present invention is not limited to the Examples.

EXAMPLE 1

To a reactor equipped with a air blowing pipe and a stirrer, 20 liters of an aqueous solution containing 1145 grams of $FeCl_2$ were added and kept at a temperature of 21° C. and then 2.68 liters of an aqueous solution of 200 grams NaOH per liter were added with stirring, into which air was blown at a velocity of 340 liters/hr. The reaction was carried out at 21° C. for 120 minutes to produce γ-FeOOH nuclei. Then the aqueous solution of $FeCl_2$ containing the nuclei was brought to a temperature of 41° C., and thereafter, air was blown at a velocity of 340 liters/hr. while maintaining that temperature, and 0.9 liter of an aqueous solution of 200 grams NaOH per liter was gradually added to effect the reaction. When the ratio of $Fe^{++}$/total Fe was 0.05, an aqueous solution of orthophosphoric.-acid was added in an amount of 0.6% by weight expressed as P based on the FeOOH to be produced and the reaction was further continued. This nuclei growing reaction was conducted for 2.5 hours. At the end of the reaction, the ratio of $Fe^{++}$/total Fe in the reaction mixture was zero.

The γ-FeOOH suspension produced in the reaction as described above was ordinarily filtered, washed with water and dried to yield acicular γ-FeOOH particles according to the present invention (Sample A).

COMPARATIVE EXAMPLE 1

The same reaction and treatment as those in Example 1 were repeated, except that no addition of the aqueous solution of orthophosphoric acid was effected, to produce a γ-FeOOH suspension. After the suspension was filtered and washed with water, the filter cake was repulped with 20 liters of water to reprepare a suspension. Then to this suspension an ammonia water was added to control pH at 9, and thereafter, the same amount of the aqueous solution of orthophosphoric acid as that in Example 1 was added. After stirring for 60 minutes, the suspension was filtered and dried to produce acicular γ-FeOOH particles (Sample B).

COMPARATIVE EXAMPLE 2

The identical procedure to that in Example 1 was carried out, except that the addition of the aqueous solution of orthophosphoric acid was accomplished (the ratio of $Fe^{++}$/total Fe=1.00), before the nucleation reaction of γ-FeOOH and the air blowing were effected, to yield acicular γ-FeOOH particles (Sample C).

Samples A to C obtained in Example 1 and Comparative Examples 1 and 2 as described above were subjected by ordinary techniques to dehydration in air at a temperature of 680° C., reduction in a hydrogen atmosphere containing moisture at 420° C. and reoxidation in air at 350° C. to produce γ-$Fe_2O_3$ particles which were evaluated by conventional methods for coercive force (Hc). Each of the thus produced samples of γ-$Fe_2O_3$ particles was used to prepare a magnetic paint by mixing and dispersing the following composition:

| | | |
|---|---|---|
| ① γ-$Fe_2O_3$ particles | 5 parts by weight |
| ② soy bean lecithin | 1.6 parts by weight |
| ③ surfactant | 4 parts by weight |
| ④ vinyl acetate-vinyl chloride copolymer resin | 10.5 parts by weight |
| ⑤ dioctylphthalate | 4 parts by weight |
| ⑥ methyl ethyl ketone | 84 parts by weight |
| ⑦ tolene | 93 parts by weight |

Next, each of the magnetic paints was coated on a polyester film to a thickness of 4 μm on dryness, and after orientation treatment, dried to make a magnetic tape.

The magnetic tapes made with the γ-$Fe_2O_3$ particles of Example and Comparative Examples were evaluated by conventional methods for coercive force (Hc: Oe), saturated magnetic flux density (Bm: Gauss), squareness (Br/Bm), ratio of orientation (OR), and switching field distribution (SFD). These results are set forth in Table 1.

TABLE 1

| Sample | Properties of particles Hc (Oe) | Properties of tape | | | | |
|---|---|---|---|---|---|---|
| | | Hc (Oe) | Bm (Gauss) | Br/Bm | OR | SFD |
| Ex. 1 | A | 351 | 366 | 1353 | 0.790 | 2.19 | 0.499 |
| Comp. Ex. 1 | B | 343 | 354 | 1416 | 0.785 | 2.04 | 0.549 |
| Comp. Ex. 2 | C | 266 | 278 | 1238 | 0.713 | 1.70 | 0.749 |

EXAMPLE 2

To a reactor equipped with a air blowing pipe and a stirrer, 3 liters of an aqueous solution containing 169 grams of $FeCl_2$ were added and kept at a temperature of 21° C. and then 201 milliliters of an aqueous solution of NaOH in a concentration of 400 grams/liter were added with stirring, into which air was blown at a velocity of 0.85 liter/minute. The reaction was carried out at 21° C. for 140 minutes to produce γ-FeOOH nuclei. Then, while air was blown into the aqueous solution of $FeCl_2$ containing the nuclei at a velocity of 0.85 liter/minute, 68 milliliters of an aqueous solution of NaOH in a concentration of 400 grams/liter was gradually added to effect the reaction. When the ratio of $Fe^{++}$/total Fe was 0.05, an aqueous solution of orthophosphoric acid was added in an amount of 0.6% by weight expressed as P based on the FeOOH to be produced. This nuclei growing reaction was conducted for 2.5 hours while maintaining the temperature at 41° C. At the end of the reaction, the ratio of $Fe^{++}$/total Fe was zero.

The γ-FeOOH suspension produced in the reaction as described above was ordinarily filtered, washed with water and dried to yield acicular γ-FeOOH particles according to the present invention (Sample D).

EXAMPLE 3

The identical treatment to that in Example 2 was carried out, except that the addition of the aqueous solution of orthophosphoric acid was accomplished at the time when the ratio of Fe++/total Fe was 0.102, to yield acicular γ-FeOOH particles according to the present invention (Sample E).

EXAMPLE 4

The identical treatment to that in Example 2 was carried out, except that the addition of the aqueous solution of orthophosphoric acid was accomplished at the time when the ratio of Fe++/total Fe was 0.15, to yield acicular γ-FeOOH particles according to the present invention (Sample F).

EXAMPLE 5

The identical treatment to that in Example 2 was carried out, except that the addition of the aqueous solution of orthophosphoric acid was accomplished at the time when the ratio of Fe++/total Fe was 0.025, to yield acicular γ-FeOOH particles (Sample G).

COMPARATIVE EXAMPLE 3

The identical treatment to that in Example 2 was carried out, except that the addition of the aqueous solution of orthophosphoric acid was accomplished at the time when the ratio of Fe++/total Fe was 0.25, to yield acicular γ-FeOOH particles (Sample H).

COMPARATIVE EXAMPLE 4

The identical treatment to that in Example 2 was carried out, except that the addition of the aqueous solution of orthophosphoric acid was accomplished at the time when the ratio of Fe++/total Fe was 0.175, to yield acicular γ-FeOOH particles (Sample I).

COMPARATIVE EXAMPLE 5

The identical treatment to that in Example 2 was carried out, except that the addition of the aqueous solution of orthophosphoric acid was accomplished at the time when the ratio of Fe++/total Fe was 0.0, to yield acicular γ-FeOOH particles (Sample J).

Samples D to J obtained in Examples 2 to 5 and Comparative Examples 3 to 5 as described above were subjected by ordinary techniques to dehydration in air at a temperature of 650° C., reduction in a hydrogen atmosphere containing moisture at 420° C. and reoxidation in air at 340 ° C. to produce γ-$Fe_2O_3$ particles which were evaluated by conventional methods for coercive force (Hc). Each of the thus produced samples of γ-$Fe_2O_2$ particles was used to prepare a magnetic paint and a magnetic tape in the same manner as in Example 1 and Comparative Examples 1 and 2.

The magnetic tapes made with the γ-$Fe_2O_3$ particles of Examples 2 to 5 and Comparative Examples 3 to 5 were evaluated by conventional methods for coercive force (Hc: Oe), saturated magnetic flux density (Bm: Gauss), squareness (Br/Bm), ratio of orientation (OR), and switching field distribution (SFD). These results are indicated in Table 2.

TABLE 2

| Sample | Properties of particles Hc (Oe) | Properties of tape | | | | |
|---|---|---|---|---|---|---|
| | | Hc (Oe) | Bm (Gauss) | Br/Bm | OR | SFD |
| Ex. 2 | D | 378 | 388 | 1424 | 0.840 | 2.80 | 0.385 |
| Ex. 3 | E | 383 | 393 | 1406 | 0.843 | 2.83 | 0.382 |
| Ex. 4 | F | 382 | 393 | 1409 | 0.841 | 2.85 | 0.387 |
| Ex. 5 | G | 375 | 384 | 1419 | 0.836 | 2.77 | 0.390 |
| Comp. Ex. 3 | H | 382 | 394 | 1408 | 0.833 | 2.70 | 0.411 |
| Comp. Ex. 4 | I | 384 | 394 | 1401 | 0.833 | 2.70 | 0.396 |
| Comp. Ex. 5 | J | 373 | 382 | 1443 | 0.832 | 2.59 | 0.400 |

The squareness, the ratio of orientation and the switching field distribution were plotted to result in a graph as shown in FIG. 1. As clearly seen from this Figure, the $Fe^{++}$ ions in the aqueous solution are gradually oxidized with the ratio of $Fe^{++}$/total Fe reaching 0.15, at the time of which drastic variations are observed to occur. Therefore, it can be appreciated that the addition of the phosphorus compounds should be effected after such time.

The γ-FeOOH particles produced by the process of the present invention are quite useful as starting materials to produce magnetic iron oxide particles such as γ-$Fe_2O_3$, berthollide and magnetite particles as well as metallic magnetic particles or cobalt modified magnetic particles derived therefrom which are good in dispersibility in mediums and suitable for the production of high density magnetic recording mediums having a high out put.

The process of the present invention allows acicular γ-FeOOH particles coated with phosphorus, which are useful as starting materials for the magnetic particles suitable for magnetic recording, to be produced efficiently by easy operation. Therefore, it is exceedingly useful in industry.

What is claimed is:

1. A process for producing acicular γ-FeOOH particles comprising the following steps:

forming a suspension containing γ-FeOOH seed crystals and a ferrous salt solution;

growing said γ-FeOOH seed crystals by oxidizing all of the $Fe^{2+}$ in the salt solution while neutralizing with alkali, wherein a phosphorus compound is added to the suspension and all of said phosphorus compound is added at the time before the end of said growing step when the ratio of $Fe^{2+}$/total Fe in the suspension is in the range of 0.15 to 0.05.

2. The process according to claim 1, wherein the suspension containing γ-FeOOH seed crystals in the ferrous salt solution is obtained by neutralizing partly the ferrous salt solution under oxidation.

3. The process according to claim 1, wherein the ratio of $Fe^{+++}$/total Fe in said suspension containing γ-FeOOH seed crystals in a ferrous salt solution is 0.8 or less.

4. The process according to claim 1, wherein said ferrous salt solution is a solution of ferrous chloride.

5. The process according to claim 1, wherein the growing temperature is 50° C. or lower.

6. The process according to claim 1, wherein the growing temperature is 30° to 45° C.

7. The process according to claim 1, wherein the growing step is controlled so that the weight of said acicular γ-FeOOH particles is not greater than three times the weight of the γ-FeOOH seed crystals.

8. The process according to claim 1, wherein said phosphorus compound is a water-soluble compound.

9. The process according to claim 1, wherein said phosphorus compound is added in the range of 0.05 to 5.0% by weight expressed as P based on the weight of the γ-FeOOH at the end of said growing step.

10. The process according to claim 1, wherein said alkali is at least one selected from the group consisting of sodium hydroxide, potassium hydroxide, sodium carbonate and ammonia.

* * * * *